United States Patent
Van Ackere et al.

(10) Patent No.: US 8,719,430 B2
(45) Date of Patent: May 6, 2014

(54) METHOD AND DEVICE FOR RECONSTRUCTING TORRENT CONTENT METADATA

(75) Inventors: Michel Van Ackere, Sint-Niklass (BE); Sudharsan Govindarajan, Antwerp (BE); Adrianus Van Ewijk, Ekeren (BE)

(73) Assignee: Alcatel Lucent, Paris (FR)

( * ) Notice: Subject to any disclaimer, the term of this patent is extended or adjusted under 35 U.S.C. 154(b) by 352 days.

(21) Appl. No.: 13/148,419

(22) PCT Filed: Feb. 8, 2010

(86) PCT No.: PCT/EP2010/051489
§ 371 (c)(1),
(2), (4) Date: Nov. 1, 2011

(87) PCT Pub. No.: WO2010/092017
PCT Pub. Date: Aug. 19, 2010

(65) Prior Publication Data
US 2012/0047202 A1   Feb. 23, 2012

(30) Foreign Application Priority Data

Feb. 10, 2009 (EP) .................................... 09305123

(51) Int. Cl.
*G06F 15/16* (2006.01)
(52) U.S. Cl.
USPC ............................ 709/228; 709/231; 709/232
(58) Field of Classification Search
USPC ......................................... 709/228, 231, 232
See application file for complete search history.

(56) References Cited

U.S. PATENT DOCUMENTS

| | | | |
|---|---|---|---|
| 8,015,283 B2* | 9/2011 | Seidel | 709/224 |
| 8,122,488 B2* | 2/2012 | Hoch et al. | 726/4 |
| 8,204,915 B2* | 6/2012 | Dolganow et al. | 707/803 |
| 8,280,958 B2* | 10/2012 | Chavez et al. | 709/204 |
| 8,386,630 B1* | 2/2013 | Atzmon | 709/231 |
| 2008/0307094 A1* | 12/2008 | Karonen et al. | 709/226 |
| 2010/0094937 A1* | 4/2010 | Chalouhi et al. | 709/204 |

OTHER PUBLICATIONS

Fonseca J. et al., "BitTorrent Protocol—BTP/1.0," Internet Citation, XP002418253, pp. 1-26, http://www.nitro.dk/jonas/bittorrent/bittorrent-rfc.ps, retrieved on Feb. 2, 2007, Aug. 14, 2005.
Greg Hazel, "BEP 9: Extension for Peers to Send Metadata Files," XP002537915, pp. 1-6, http://www.bittorrent.org/beps/bep_0009.html, retrieved on Jul. 16, 2009.
Bram Cohen, "BEP 3: The BitTorrent Protocol Specification," XP002537916, pp. 1-9, http://bittorent.org/beps/bep_0009.html, retrieved on Jul. 16, 2009.
International Search Report for PCT/EP2010/051589 dated Apr. 8, 2010.

* cited by examiner

*Primary Examiner* — Larry Donaghue
(74) *Attorney, Agent, or Firm* — Fay Sharpe LLP

(57) ABSTRACT

A method for reconstructing torrent content metadata, i.e. a torrent identifier, a segment length and an amount of segments of a torrent content file, without access to the torrent content metafile, comprises the steps of: A. obtaining the torrent content identifier from torrent signaling from a client; B. obtaining a torrent content file size from said torrent signaling from said client; C. obtaining a tracker address from said torrent signaling from said client: D. obtaining a peer address from a tracker; E. contacting a peer via the peer address; F. downloading sequential minimum size blocks of a full size segment from the peer in order to determine the segment length; G. calculating the amount of segments from the torrent content file size and the segment length.

9 Claims, 1 Drawing Sheet

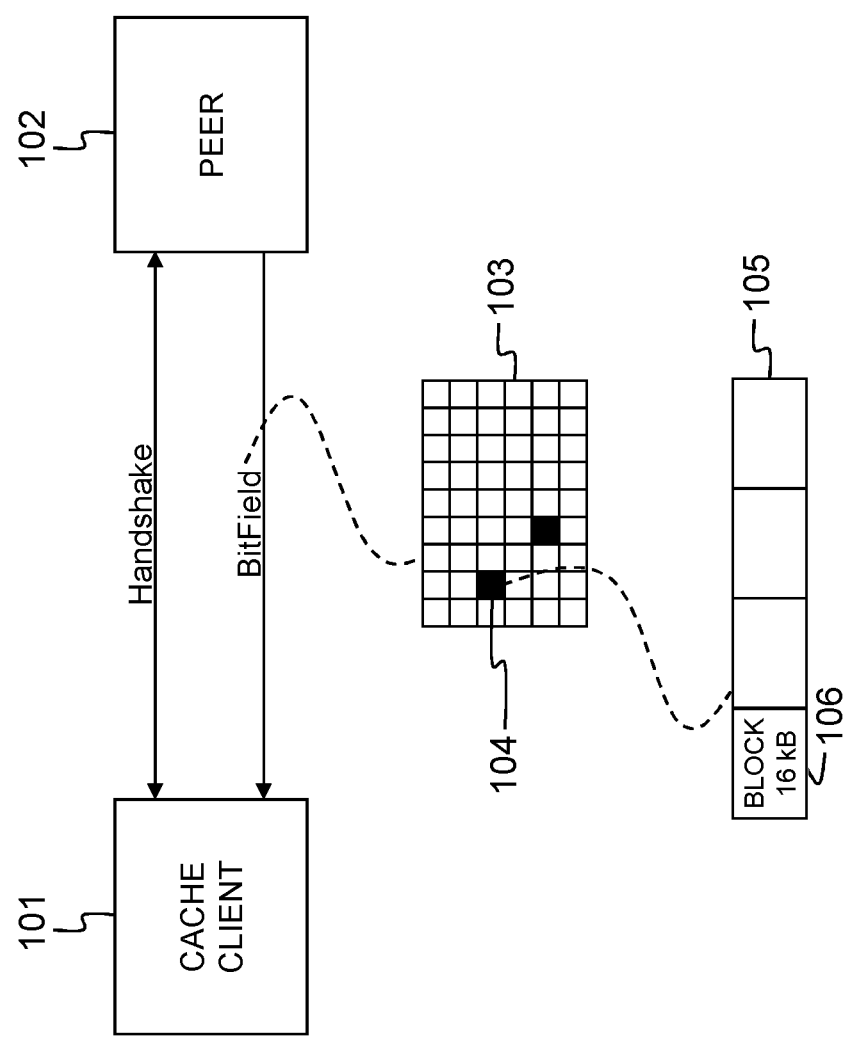

METHOD AND DEVICE FOR RECONSTRUCTING TORRENT CONTENT METADATA

FIELD OF THE INVENTION

The present invention generally relates to peer-to-peer communication, more particularly to downloading and caching a torrent content file whose fixed size pieces or segments are stored on one or plural peers. The torrent content file may for instance be a movie file, an audio file, a software file, etc. The downloading and caching concerns the storing of the torrent content file on another client than the one that actually initiated the download. Typically, two downloads will be ongoing: one regular download towards the initiating client according to state-of-the-art mechanisms and one particular download for the caching client according to the present invention.

BACKGROUND OF THE INVENTION

BitTorrent is a peer-to-peer communication protocol that enables a BitTorrent client to download fixed size segments of a torrent content file from one or plural peers in order to reconstitute the torrent content file, e.g. a movie or song. The BitTorrent client thereto needs a unique torrent content identifier with which it contacts an Internet tracker which holds a list of the peers that store segments of the torrent content file. This unique torrent content identifier is advertised as upfront knowledge in the torrent content metafile. The BitTorrent client receives the IP addresses of these peers from the Internet tracker and consequently can start exchanging segments with these peers in order to download and reconstitute the entire torrent content file. The BitTorrent client thereto needs the torrent content file size, the number of segments in which the torrent content file has been divided and the fixed length for all but the last such segments. These metadata are also advertised as upfront knowledge in the torrent content metafile.

The drawback of the above described, known method for downloading and caching torrent content is that the torrent content metafile may not always be available to all the clients that desire to download the torrent content file, as a result of which downloading and caching the torrent content file is not possible for clients that have no access to the torrent content metafile.

It is an objective of the present invention to disclose a method and device for reconstructing missing torrent content metadata that is necessary to allow the download of a torrent content file without having access to the torrent content metafile.

SUMMARY OF THE INVENTION

According to the present invention, the above defined objective is realized and the drawback of the prior art is overcome by the method for reconstructing missing torrent content metadata as defined by claim 1, comprising the steps of:

A. obtaining a torrent content identifier from torrent signaling from a client;

B. obtaining a torrent content file size from said torrent signaling from said client;

C. obtaining a tracker address from said torrent signaling from said client;

D. obtaining a peer address from a tracker;

E. contacting a peer via the peer address;

F. downloading sequential minimum size blocks of a full size segment from the peer in order to determine the segment length; and G. calculating the amount of segments from the torrent content file size and the segment length.

Indeed, according to the invention, the client that desires to download and cache a torrent content file obtains the torrent content identifier, e.g. the infohash in case of BitTorrent, from signaling from another, standard client that is downloading the targeted torrent content file with access to the metafile. The caching client that operates according to the present invention however does not have access to the metafile. This caching client further needs to obtain from an Internet tracker the IP address of a peer that holds a full size segment of the targeted torrent content file. Typically, the caching client will receive more than one peer address in answer to a single request. The caching client operating according to the present invention contacts an Internet tracker (whose address has been obtained from the torrent signaling from the standard client) and obtains from the Internet tracker the IP address of a peer that stores a segment of the targeted torrent content file. Should the peer contain only a single segment with no guaranteed full segment size, the steps D and E may have to be repeated iteratively as will be explained below. It is also noticed that typically, the caching client will receive more than one peer address in answer to a request in step D. By sequentially downloading minimum size blocks, e.g. 16 kByte blocks, until a block request is rejected, the client can learn the size of a segment. From the BitTorrent signaling from the standard client, the caching client further obtains the torrent content file size. The last missing parameter, the amount of segments in the torrent content file, can be determined by the caching client from the segment size and the torrent content file size (and eventual verification against the Bitfield length, as will be explained below).

Apart from the method defined by claim 1, the present invention also relates to a corresponding device as defined by claim 8, e.g. a carrier or memory device holding software for executing the method of claim 1.

Any system that desires to cache torrent content without having access to the torrent content metafile(s) may take benefit of the present invention. An example of such systems is a BitTorrent client, as is indicated by claim 9.

Further optionally, as defined by claim 2, step E of the method according to the present invention may comprise handshaking with the peer, thereby retrieving the peer's Bitfield, each bit in the Bitfield being representative for the availability of a corresponding segment of the torrent content file.

Indeed, the BitTorrent client will contact the peer whose IP address has been received from the Internet tracker in order to receive a Bitfield associated with the targeted torrent content file. This Bitfield is received in response and will indicate the possible maximum number of segments (corresponding to the Bitfield length) and which segments of the torrent content file are stored in the peer. The Bitfield typically contains as many bits as there are segments in the torrent content file. In the Bitfield, a bit is set ("one" or "true") when the corresponding segment is available and downloadable from the peer and a bit is not set ("zero" or "false") when the corresponding segment is not available at the peer.

Further optionally, as defined by claim 3, step F of the method according to the present invention may comprise:

iteratively repeating step E and eventually also step D until the Bitfield contains plural bits set, or until only the first bit in the Bitfield is set;

selecting a bit in the Bitfield that is set, the bit being different from the last bit in the Bitfield that is set unless only the first bit in the Bitfield is set;

sending block requests to the peer for minimum size blocks of a segment corresponding to the selected bit until a block request is rejected;

counting the number of block requests sent; and multiplying the number of block requests with the minimum size block length to thereby determine the segment length.

Indeed, the caching client needs to derive the piece size (or segment size or segment length) from the Bitfield. The caching client shall thereto sequentially download small blocks of a segment until it reaches the border of the segment, but upfront needs guarantees that the segment that is downloaded is a full size segment. Typically, the last segment of the torrent content file will not be a full size segment. Therefore, the last set bit in the received Bitfield might or might not represent a full size segment and cannot be used by the caching client to determine the segment length. The caching client consequently will sequentially download small blocks of a segment corresponding with a bit in the Bitfield that is different from the last set bit. If the Bitfield contains only one set bit, the client will discard the Bitfield and will attempt handshaking with a different peer by repeating steps D and E. In case the caching client has received multiple peer addresses in a previous execution of step D, step D need not be repeated as the caching client can attempt to contact one of the other peers. Exceptionally, when the Bitfield contains only one set bit and this bit is the first bit in the Bitfield, the caching client can select the first segment for gradual downloading to establish the segment length. The caching client will start sending requests for minimum size blocks of the selected segment. When a block request is rejected, this indicates the end of the segment. By counting the number of unrejected block requests sent, and multiplying this number with the length of a minimum size block, e.g. 16 kByte, the caching client can determine the segment length for the targeted torrent content file.

Also, as defined by claim 4, step A of the method according to the present invention may comprise obtaining a unique torrent identifier (i.e. infohash) identifying the torrent content file from BitTorrent signaling.

Indeed, in case of BitTorrent, a unique torrent identifier (i.e. infohash identifying the torrent content file can be obtained from BitTorrent signaling from a standard client that is downloading the targeted torrent content file with access to the metafile.

Another optional aspect of the method according to the present invention, defined by claim 5, is that step B may comprise:

obtaining the number of bytes downloaded and the number of bytes left from BitTorrent signaling from a standard BitTorrent client; and determining the torrent content file size by summing the number of bytes downloaded and the number of bytes left.

Again, in case of BitTorrent, the number of bytes left and the number of bytes downloaded can be obtained from BitTorrent signaling from another, standard client that is downloading the torrent content file with access to the metafile. These two figures, when summed together, give the client an estimate on the torrent content file size. In case where the reported file size however is doubtful, the client may elect to determine the file size from the Bitfield length, i.e. the maximum Bitfield length received from peers in step E or iterations of this step, and the segment length as determined in step F. It is noticed here that the multiplication of the Bitfield length and segment size may be different from the actual torrent content file size since the last segment may be an incomplete one.

Further optionally, as defined by claim 6, in the method according to the present invention step G may comprise determining the amount of segments through dividing the torrent content file size by the segment length.

Indeed, the client still has to derive the number of pieces or amount of segments that constitute the targeted torrent content file in order to complete its knowledge of the metadata. By dividing the file size as determined in step E by the segment length as determined in step C, the client can calculate the amount of segments.

As is indicated by claim 7, the method for reconstructing torrent content metadata according to the present invention may be complemented with the optional step:

H. downloading and caching one or more segments of the torrent content file.

Thus, with the knowledge of the torrent identifier an the reconstructed metadata, i.e. the torrent content file size, the segment length and the amount of segments, the client or caching node can start downloading the torrent content file and store it partially or entirely in cache memory.

BRIEF DESCRIPTION OF THE DRAWINGS

FIG. 1 illustrates an embodiment of the method for reconstructing torrent content metadata without access to the torrent content metafile according to the present invention.

DETAILED DESCRIPTION OF EMBODIMENT(S)

FIG. 1 shows a BitTorrent cache client 101 and a peer 102, i.e. a machine that stores certain segments of a torrent content file, e.g. a movie file "Raiders of the Lost Ark". It is assumed that the peer 102 also supports the BitTorrent protocol. Both the cache client 101 and peer 102 have Internet connectivity and the cache client 101 has obtained the IP address of the peer 102 from an Internet tracker from BitTorrent signaling from another, standard client that is downloading the targeted movie file with access to the metafile.

From the BitTorrent signaling from the other, standard client, the cache client 101 further obtains a unique torrent identifier (i.e. infohash) identifying the targeted torrent content file, i.e. the movie "Raiders of the Lost Ark", and the amount of bytes left and amount of bytes downloaded, the sum of which gives the expected torrent content file size.

The cache client 101 contacts the peer 102 to receive a Bitfield associated with the targeted torrent content file, i.e. the movie "Raiders of the Lost Ark". This is the first handshake with the peer 102. The Bitfield 103 is received in the response from the peer 102.

From the received Bitfield 103 the cache client 101 has to derive the segment size and the number of segments of the targeted torrent content file. This is done as follows. The cache client 101 first has to find a segment that has guaranteed full segment size. Any bit, except the last set bit in the Bitfield 103 represents a segment with guaranteed full segment size that can be downloaded from the peer 102. The last set bit might or might not represent a segment with full segment size and therefore cannot be relied upon to determine the segment size. If the Bitfield would have only one bit set and if this is not the first bit then the cache client 101 cannot derive the segment size from the Bitfield. In such case, the cache client 101 would discard the Bitfield and try handshaking with a different peer. In FIG. 1, it is assumed that the Bitfield 103 contains more than one set bit. The cache client 101 takes any set bit before the last one, e.g. bit 104, and that bit number as the ID to start downloading the corresponding segment of the torrent content file. The cache client 101 informs the other peer 102 that it is interested in the segment corresponding to the selected bit 104 in the Bitfield 103. The cache client 101 thereupon starts sending piece requests for minimum size blocks 105, i.e. subsequent blocks of 16 kByte like block 106. The cache client 101 also keeps a count on the number of block requests sent. As soon as a block request is rejected, this indicates the end of the segment. The cache client 101 can now compute the segment size from the number of successful block requests multiplied with the block size. The cache client 101 at last determines the number of segments through dividing the file size by the segment size or, in case where the file size cannot be trusted, from the maximum Bitfield length multiplied with the segment size.

In the embodiment described here above, it is assumed that the initially reported file size is correct, i.e. the initial client requesting the cache client 101 to cache the torrent content file provides correct and complete bytes left and bytes downloaded information. A slight modification of the embodiment described here above allows the download of (nearly complete) torrent content, even in the case where the initially reported file size is incorrect. In another alternate embodiment, multiple peers may be contacted concurrently in order to increase the probability that a peer holding a full size segment will be contacted and consequently reduce or avoid iterations of steps A and B of the method.

Although the present invention has been illustrated by reference to specific embodiments it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfill the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A method for reconstructing torrent content metadata, i.e. a torrent content file size, a segment length and an amount of segments of a torrent content file, without access to the torrent content metafile,
   wherein said method comprises the steps of:
   A. obtaining a torrent content identifier from torrent signaling from a client;
   B. obtaining a torrent content file size from said torrent signaling from said client;
   C. obtaining a tracker address from said torrent signaling from said client;
   D. obtaining a peer address from a tracker;
   E. contacting a peer via said peer address;
   F. downloading sequential minimum size blocks of a full size segment from said peer in order to determine said segment length; and
   G. calculating said amount of segments from said torrent content file size and said segment length.

2. A method for reconstructing torrent content metadata according to claim 1,
   wherein said step E comprises handshaking with said peer, thereby retrieving said peer's Bitfield, each bit in said Bitfield being representative for the availability of a corresponding segment of said torrent content file.

3. A method for reconstructing torrent content metadata according to claim 2,
   wherein said step F. comprises:
      iteratively repeating said step E and eventually also said step D until said Bitfield contains plural bits set, or until only the first bit in said Bitfield is set;
      selecting a bit in said Bitfield that is set, said bit being different ro the last bit in said Bitfield that is set unless only the first bit in said Bitfield is set,
      sending block requests to said peer for minimum size blocks of a segment corresponding to the selected bit until a block request is rejected;
      counting the number of block requests sent; and
      multiplying said number of block requests with the minimum size block length to thereby determine said segment length.

4. A method for reconstructing torrent content metadata according to claim 1,
   wherein said step A comprises obtaining a unique torrent identifier or infohash identifying said torrent content file from BitTorrent signaling.

5. A method for reconstructing torrent content metadata according to claim 1,
   wherein said step B comprises:
      obtaining the number of bytes downloaded and the number of bytes left from BitTorrent signaling; and
      determining the torrent content file size by summing the number of bytes downloaded and the number of bytes left.

6. A method for reconstructing torrent content metadata according to claim 1,
   wherein said step G comprises determining said amount of segments through dividing said torrent content file size by said segment length.

7. A method for reconstructing torrent content metadata according to claim 1,
   wherein said method further comprises the step of:
   H. downloading and caching one or more segments of said torrent content file.

8. A torrent information reconstruction device adapted to perform the method of claim 1.

9. A torrent information reconstruction device according to claim 8,
wherein said torrent ion reconstruction device is integrated in a BitTorrent client.

* * * * *

UNITED STATES PATENT AND TRADEMARK OFFICE
CERTIFICATE OF CORRECTION

PATENT NO. : 8,719,430 B2  Page 1 of 1
APPLICATION NO. : 13/148419
DATED : May 6, 2014
INVENTOR(S) : Van Ackere et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 435 days.

Signed and Sealed this

Twenty-ninth Day of September, 2015

Michelle K. Lee
*Director of the United States Patent and Trademark Office*